(12) United States Patent
Corte et al.

(10) Patent No.: US 6,698,845 B2
(45) Date of Patent: Mar. 2, 2004

(54) VEHICLE WHEEL WITH BALANCE WEIGHT RETENTION MEANS ON FLANGE

(75) Inventors: Claudio Corte, Limeira (BR); Joao Batista Tulimosky, Cordeiropolis (BR)

(73) Assignee: Meritor do Brasil Ltda, Limeira (BR)

( * ) Notice: Subject to any disclaimer, the term of this patent is extended or adjusted under 35 U.S.C. 154(b) by 0 days.

(21) Appl. No.: 10/156,679

(22) Filed: May 28, 2002

(65) Prior Publication Data

US 2003/0137186 A1 Jul. 24, 2003

(30) Foreign Application Priority Data

Jan. 24, 2002 (BR) ................................................ 200177

(51) Int. Cl.$^7$ .............................. B60B 1/00; B60B 27/00
(52) U.S. Cl. ..................................................... 301/5.21
(58) Field of Search ........................... 301/5.21, 5.22; 73/458, 461, 468, 469, 470; 74/573 R

(56) References Cited

U.S. PATENT DOCUMENTS

| | | | | |
|---|---|---|---|---|
| 2,775,487 A | * | 12/1956 | Hennecke | 301/5.21 |
| 3,890,008 A | * | 6/1975 | Lejeune | 301/5.21 |
| 4,720,149 A | * | 1/1988 | Thissen et al. | 301/5.21 |
| 5,350,220 A | * | 9/1994 | Atwell, Jr. | 301/5.21 |
| 5,733,016 A | | 3/1998 | Brown | |
| 6,238,006 B1 | | 5/2001 | Manojlovic | |

* cited by examiner

Primary Examiner—S. Joseph Morano
Assistant Examiner—Jason R. Bellinger
(74) Attorney, Agent, or Firm—Alston & Bird LLP

(57) ABSTRACT

A wheel, especially for use on vehicles, comprises at least one end region having an outer surface and comprising a free end, the end region being provided with at least one fitting recess for fitting at least one wheel balance weight, the recess defining at least one contact surface that projects from the free end on the outer surface of the end region, the contact surface being capable of interacting by friction with a balance weight fixing clamp.

20 Claims, 3 Drawing Sheets

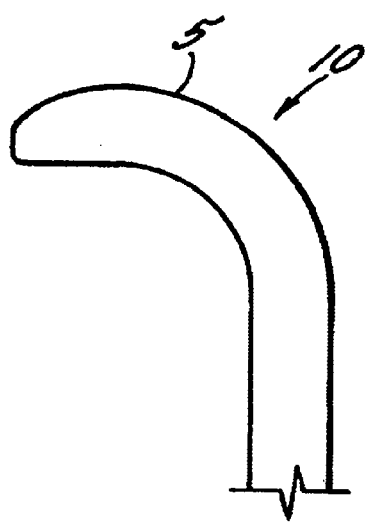
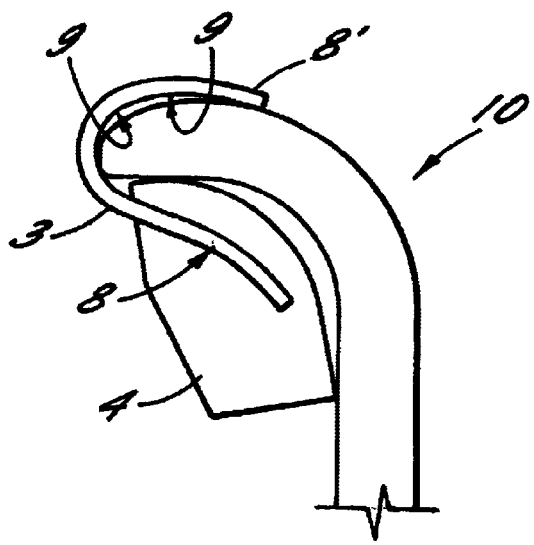
fig.1.
(PRIOR ART)
fig.2.
(PRIOR ART)
DET. A.
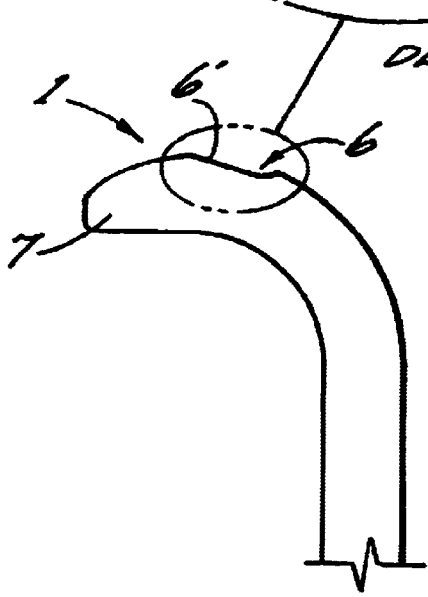
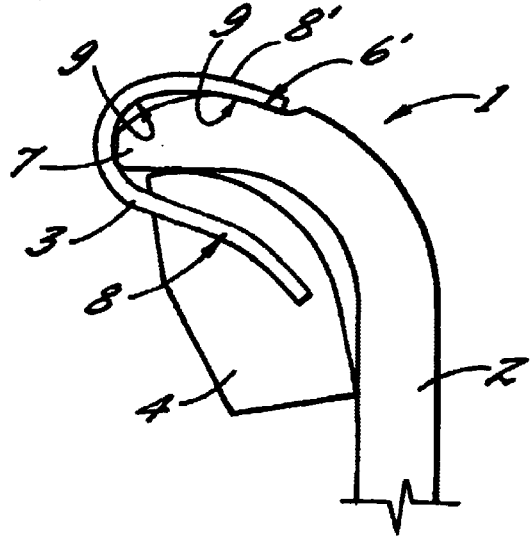
fig.3.
fig.4.

VEHICLE WHEEL WITH BALANCE WEIGHT RETENTION MEANS ON FLANGE

FIELD OF THE INVENTION

The present invention relates to a stamped-steel wheel, especially for use on an automotive vehicle, provided with a recess for correct fixation of the wheel balance weight in order to achieve a dynamic counterbalance of the wheel-tire assembly, as well as a wheel rim and a wheel disc thus configured.

BACKGROUND OF THE INVENTION

Conventional steel wheels comprise a rim and a disc associated with each other, the rim being responsible for fixing the tire to the wheel by means of two end regions or flanges that form a channel for fixing the tire. Alternatively, there may be a stamped-steel wheel, wherein the outer flange is an integral part of the disc. On any one of these types of wheel, these two end regions or flanges are protuberant and constitute the wheel region where the diameter is maximum. The flanges have a substantially curved ")"-shaped profile with its free tip substantially perpendicular to the remainder of the flange body.

Beside serving as a tire guide, the flange enables one to affix wheel balance weights to the wheel so as to balance dynamically the wheel-tire assembly, enabling the vehicle equipped with the wheel to travel at a range of speeds without excessive vibration of the assembly. The balance weight comprises a body made of metal (as for example, lead or another high-density metal/alloy), from which a substantially "U"-shaped metallic fixation clamp projects, a first end of the clamp being associated with the metal body and a second end being free.

To fix the counterbalance weight on the wheel, the weight is positioned on the flange and forced to move against the wheel so that the opening of the "U"-shaped clamp engages the free end of the flange. As the weight is pressed against the wheel, the "U"-shaped clamp is forced open by the free end of the flange until the metallic body touches the outer surface of the flange body. The U-shaped clamp is resilient and thus applies a force on the tip of the flange because of its tendency to want to return to its normal undeformed shape, thus exerting a normal force component on the flange that causes friction between the clamp and the flange. Accordingly, the balance weight is fixed in position on the wheel, even when there is rotary motion of the wheel.

In the case of painted wheels, the friction coefficient presented by the surface of the flange tip is sufficient to provide sufficient friction force to maintain the balance weight correctly positioned, even if the vehicle equipped with the wheel runs at high speeds (which results in a high wheel rotational speed and thus a strong centrifugal force that tends to loosen the weight) and passes over obstacles on roads, such as holes or other unevenness/irregularities.

On the other hand, common wheels made of stamped steel have the drawback of being not particularly esthetically attractive, which is a factor that limits their penetration in the market, especially in the case of luxurious and expensive vehicles. With a view to eliminate this drawback, there have been developed steel wheels with a chromed finish, which significantly improves the wheels' appearance, making them more desirable as original equipment or as after-market accessory items. However, the chromed finish of the wheel, and hence of the flange tip, causes a reduction in the friction coefficient of the surface of the flange on which the clamp of the counterbalance weight is fixed. This reduced friction coefficient proves insufficient to maintain the counterbalance weight in the desired position, even if it is fixed correctly by the above-described process. Thus, when the vehicle equipped with such chromed steel wheels runs at high speeds or passes over holes or other irregularities on the ground, the possibility of the wheel weight becoming loose is not negligible, which entails a significant drawback in using such wheels.

For the purpose of eliminating these drawbacks, U.S. Pat. No. 6,238,006 discloses a vehicle wheel rim having a flange provided with a recess for engaging the clamp of the balance weight. The recess comprises a shoulder, which engages a barb or projection formed on the balance weight clamp, such that a shape-locking engagement occurs between the clamp and the recess. Although the arrangement may eliminate the above-mentioned drawbacks, the arrangement requires a specially designed balance weight clamp provided with a locking projection configured to work with the particular recess shape. A conventional smooth-walled clamp would not work with the recess of the '006 patent.

Another solution is proposed in U.S. Pat. No. 5,733,016, which discloses a wheel having a flange provided with a concave recess and a counterbalance weight whose clamp has a hemmed free end configured to fit into the recess in such a way that the balance weight will have greater adherence to the wheel. In this arrangement also, the balance weight clamp must be specially designed to work with the particular recess shape; a conventional smooth-walled clamp would not work with the recess.

SUMMARY OF THE INVENTION

The objective of the present invention is to provide a steel wheel, especially for an automotive vehicle, which presents solutions for the fixation of the wheel balance weight on the wheel flange so that the wheel can have any type of surface finish, even if this entails a reduced friction coefficient, and so that a conventional balance weight having a smooth-walled balance weight clamp can be securely affixed to the wheel flange.

It is also an objective of the present invention to provide a wheel rim and a wheel disc that present solutions for the fixation of the wheel weight independently of the friction coefficient presented by its surface, and so that a conventional balance weight having a smooth-walled balance weight clamp can be securely affixed to the wheel flange.

The objectives of the present invention are achieved by means of a wheel, especially for use on vehicles, comprising a peripheral wheel flange defining an end region that has a portion that extends generally radially outwardly and transitions into a further portion that extends generally axially up to a free end, a generally radially facing surface of the end region defining a fitting recess therein for engagement by at least one wheel balance weight. The recess defines a contact surface having a length extending away from the free end of the end region, the contact surface being configured to contact and frictionally engage a balance weight fixing clamp whose wall is free of locking projections or protuberances.

Preferably, the balance weight clamp contacts the contact surface of the recess along substantially the entire length of the contact surface. The substantial surface area contacted by the clamp thus provides increased frictional force.

Preferably, the cross-sectional shape of the recess (in the radial-axial plane) is substantially wedge-shaped. It is also preferred that the contact surface of the recess be substantially conical, which facilitates having substantially the entire length of the contact surface in contact with the clamp of the balance weight.

Also, the objectives of the present invention are achieved by means of a wheel rim, especially for use on a wheel designed for use on vehicles, comprising a peripheral flange as described above.

Further, the objectives of the present invention are achieved by means of a wheel disc, especially for use on a wheel designed for use on vehicles, comprising a peripheral flange as described above.

The wheel configured according to the teachings of the present invention has the advantage of enabling one to fix weights correctly for counterbalance, even in the case of a chromed finish, which is esthetically more attractive but has a quite smooth surface finish. The invention provides a wheel that presents the esthetics desired by the market, reduced manufacture cost, and efficiency in fixing weights for counterbalance.

BRIEF DESCRIPTION OF THE DRAWINGS

The present invention will now be described in greater detail with reference to one preferred embodiment represented in the drawings. The figures show:

FIG. 1: a cross-section view of the flange of a wheel of the prior art, without the balance weight;

FIG. 2: a cross-section view of the flange of a wheel of the prior art with the balance weight fixed;

FIG. 3: a cross-section view of the flange of a wheel in accordance with a preferred embodiment of the present invention without the balance weight;

FIG. 4: a cross-section view of the flange of the wheel of the present invention with the balance weight fixed;

DETAILED DESCRIPTION OF PREFERRED EMBODIMENT

Figure 5:
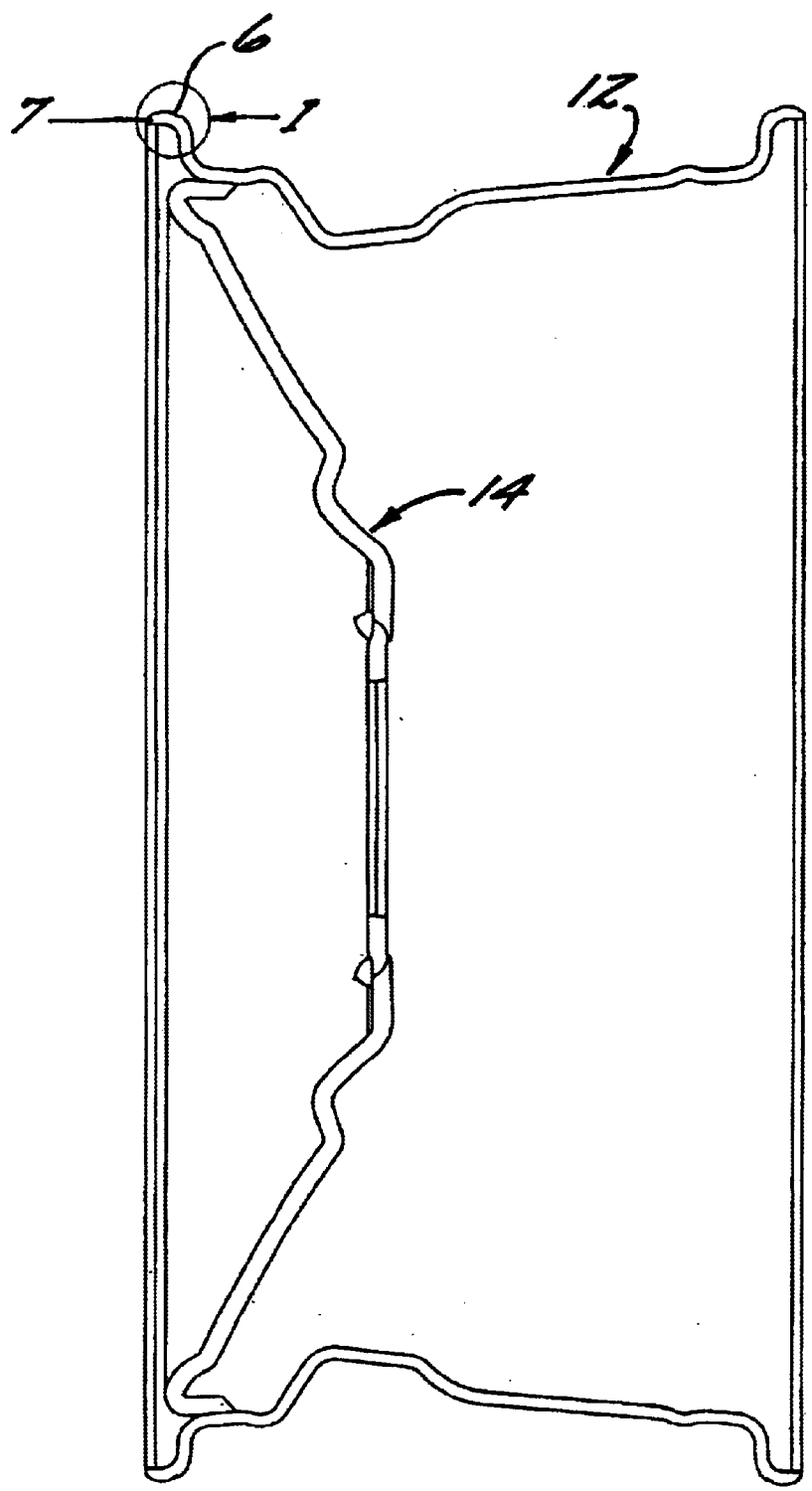
FIG. 5: a cross-section view of a wheel in accordance with one embodiment of the invention, having two flanges each defining a fitting recess therein for accommodating a balance weight fixing clamp.

According to the preferred embodiment and as can be seen from FIGS. 3 and 5, the wheel of the present invention comprises a cylindrical wheel rim 12 and a substantially circular wheel disc 14, associated with each other.

The wheel rim has at least one end region 1 (projecting from its side wall), also called a wheel flange, which is protuberant and constitutes the region of the wheel where its diameter is maximum. This flange 1 has a substantially curved ")"-shaped profile with its free end being substantially perpendicular to the remainder of the flange body 1; i.e., one portion of the flange 1 extends generally radially outwardly and then transitions into a further portion that extends generally axially up to a free end of the flange (the radial direction being top-to-bottom and the axial direction being left-to-right in the figures). As a rule, wheel rims have two flanges 1 spaced axially apart and arranged so that the flanges curve outwardly away from each other, thus forming a channel in which the tire is retained.

Figure 6:
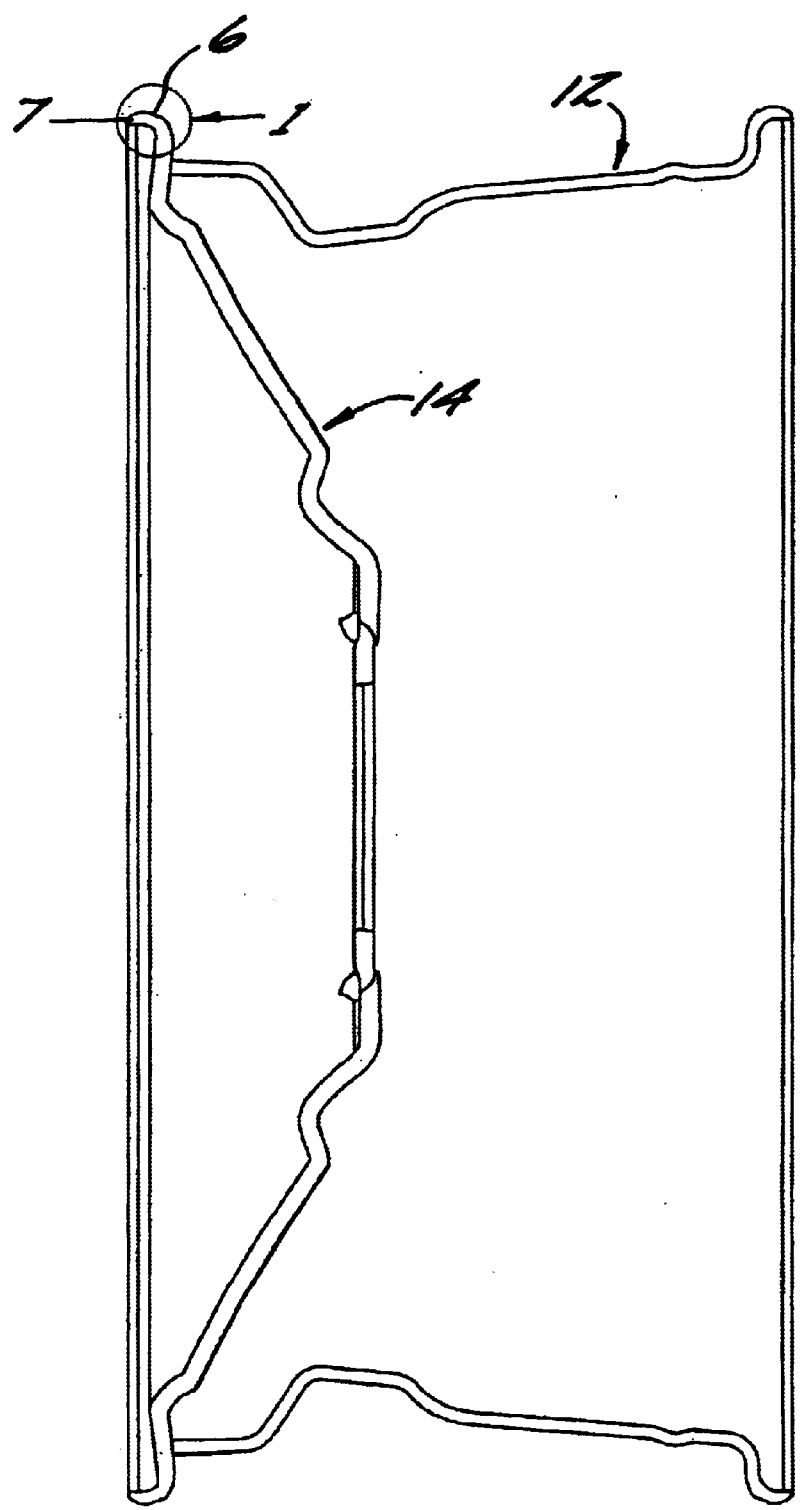
FIG. 6: a cross-section view of a wheel in accordance with another embodiment of the invention, having two flanges, one formed on the wheel rim and the other formed on a wheel disc of the wheel.

Alternatively, as shown in FIG. 6, one may conceive a wheel wherein the rim 12 defines one of the flanges 1, and the disc 14 defines the other flange 1, so that, when the rim and disc are associated with each other, the visual and functional result is identical to that obtained when the wheel rim defines both flanges 1.

The two wheel flanges 1 and the remainder of the rim wall define a channel in which the tire is placed, so that the side wall of the tire close to its opening (also known as a tire bead) is supported by the flanges. When the tire is inflated with compressed air, the force exerted by it keeps the tire in its position, avoiding any movement of the tire bead with respect to the flange 1.

The flange 1, which is substantially ")"-shaped, as already mentioned, has a free end 7 (also referred to as the generally axially extending portion) and a body 2 (also referred to as the generally radially extending portion). The free end 7 projects in a curve from the body 2, so that the free end is oriented substantially perpendicular to the body 2.

The flange 1 further has a fitting means in the form of a recess 6, to allow a balance weight 3, 4 to fit. This recess 6 preferably is positioned on the outer surface of the free end 7 of the flange 1, that is, the surface facing the tire, and is substantially annular, extending along the whole perimeter of the flange 1 of the rim. Preferably, in order to enable one to position the balance weight 3, 4 (which will be described below) correctly, the recess 6 has a substantially wedge-shaped cross-section or profile, in order to provide a contact surface 6' of substantial length between the flange 1 and the wheel balance weight (unlike the wheel of the prior art, mentioned before). However, any other shape of the cross-section or profile of the recess 6 may be utilized, as long as it provides correct fixation of the counterbalance weight. Preferably, both wheel flanges 1 have the recess, a wheel wherein only one of the flanges 1 has this recess 6 is also possible.

The contact surface 6' preferably is substantially parallel to a surface projection of the end region onto the point where the fitting means 6 is located. In greater detail, since the recess 6 is positioned on the outer surface of the free end 7 of the flange 1, the contact surface 6' is substantially parallel to the projection of the outer surface of the free end 7 of the flange 1 on the point where the recess 6 is placed, that is to say, it is substantially parallel to the outer surface of the free end of the flange that would exist there if there were no recess 6. In the preferred embodiment as shown, the contact surface 6' is substantially straight in cross-section (i.e., in the radial-axial plane), and preferably is substantially conical.

The balance weight comprises a weight element or body 4 made of metal, as for example lead or other high-density metal/alloy, from which a metallic fixation clamp 3 projects (that is to say, the clamp 3 is connected with the weight element 4) as a substantially U-shaped smooth wall, with a main end edge 8 associated with the metal body 4 and a second main free-end edge 8'. The clamp 3 further has a first inner-wall surface 9 facing the flange when the weight is attached to the wheel, and a second outer-wall surface opposite the first one.

In other words, the first inner-wall surface 9 corresponds to the inner surface of the "U", defined by the clamp 3, and the shape of the latter defines a recess, cavity or internal opening.

The U-shaped wall of the clamp 3 is smooth, i.e., it does not have any protuberance or projection from the inner surface 9 for fixation of the balance weight 3, 4. The U-shaped wall may even have bores and recesses, provided that they do not give rise to any protuberance.

To fix the balance weight 3, 4 to the wheel, the weight is positioned on the desired flange (which may be the flange turned toward the outside of the wheel-arches of the vehicle, the flange turned toward the inside of the wheel-arches of the vehicle, or both flanges, depending upon the unbalance situation of the wheel/tire assembly) and force it to move against the wheel, so that the opening of the U-shaped clamp 3 brings about the cooperation of the free end of the flange. As the weight 3, 4 is pressed against the wheel, the U-shaped clamp opens, until the metallic body 4 touches the flange body. At this moment the first inner-wall surface 9 of the clamp 3 is in contact with and frictionally engages the contact surface 6' of the recess 6. The contact between the contact surface 6' and the inner wall 9 of the balance weight 3, 4 preferably occurs over substantially the entire length (i.e., the length in the radial-axial plane) of the surface 6'.

Then, the U-shaped clamp 3, which is more open in a forced position, exerts a force on the contact surface 6' because of the tendency of the clamp to return to its undeformed shape, thus generating a normal force component on the flange. This normal force increases the friction between the inner-wall surface 9 of the clamp 3 and the contact surface 6', keeping the balance weight 3, 4 stable in its position, even when the wheel moves.

As can be seen in FIGS. 3 and 4 and as exemplified above, the recess 6 provides this large contact surface 6' between the inner-wall surface 9 of the clamp 3 and the flange 1, so that the friction between these components is considerably greater than the friction between the weight 3, 4 and the flange 10 of the prior art (FIGS. 1 and 2), or in the case of the flange of the wheel provided with a recess having a half-moon-shaped cross-section, as disclosed in the prior art. This contact surface 6' enables one to fix the wheel balance weight 3, 4 even to wheels having a considerably smooth surface finish (as for example, chromed wheels), without the weights becoming loose due to rotation and/or vibration of the wheel while the vehicle is in motion. As already mentioned, other recess profiles may be used, as long as they provide adequate fixation of the balance weight 3, 4. For instance, it is possible to use a recess with a side-section end that presents a right angle (a semicircular profile recess), this end in right angle configuring a "protuberance" that enables the clamp 3 to grip the counterbalance weight correctly.

In addition, the region of the inner-wall surface 9 of the clamp 3 that touches the contact surface 6 may be relatively closer to the first main free-end edge 8' or in a region closer to the weight element 4. These variations do not limit the scope of the invention.

The wheels known from the prior art, the flanges 10 of which are illustrated in FIGS. 1 and 2, do not have any recess for placing the balance weight 3, 4, as can be seen in the region 5, which follows the curvature of the remainder of the piece. A comparative detail between the flange of 10 of the prior art and the flange of the present invention 1 can be seen in the overlapping box called DET. A.

Evidently, one may conceive any type of wheel provided with a recess 6 having a contact surface 6' for fixing the balancing weight 3, 4 other than only wheels composed of a rim and a disc, as for example wheels cast from light-metal alloys, spoked wheels, wheels made of other materials or any other.

The present invention enables one to use wheels with various surface finishes from quite smooth to relatively rough. The geometry and thickness of the flange 1 and of the recess 6 may vary.

A preferred embodiment having been described, it should be understood that the scope of the present invention embraces other possible variations, being limited only by the contents of the accompanying claims.

What is claimed is:

1. A wheel, comprising a peripheral wheel flange defining an end region that has a portion that extends generally radially outwardly and transitions into a further portion that extends generally axially outwardly to a free end, a generally radially facing surface of the end region defining a fitting recess therein for engagement by at least one wheel balance weight, a portion of a bottom of the recess comprising a contact surface having a length extending generally axially away from the free end of the end region, the contact surface being configured to contact and frictionally engage a wall of a balance weight fixing clamp wherein said wall is free of locking projections or protuberances, the contact surface being substantially parallel to a projection of said generally radially facing surface of the end region at the location of the recess.

2. A wheel according to claim 1, wherein the contact surface over the length of said contact surface is substantially linear in a radial-axial plane of the wheel.

3. A wheel according to claim 1, wherein the contact surface is configured to contact a smooth wall of a balance weight fixing clamp along substantially the entire length of the contact surface.

4. A wheel according to claim 3, wherein the balance weight fixing clamp is formed as a substantially U-shaped smooth wall.

5. A wheel according to claim 1, wherein the recess is annular and has a wedge-shaped cross-section.

6. A wheel according to claim 1, wherein the recess is defined in a generally radially outwardly facing surface of the end region.

7. A wheel according to claim 1, wherein the wheel has two flanges each having said end region and recess.

8. A wheel according to claim 1, wherein the contact surface of the recess is substantially conical.

9. A wheel rim, comprising a peripheral wheel flange defining an end region that has a portion that extends generally radially outwardly and transitions into a further portion that extends generally axially outwardly to a free end, a generally radially facing surface of the end region defining a fitting recess therein, the recess extending circumferentially about the wheel flange for engagement by at least one wheel balance weight, the recess defining a contact surface having a length extending generally axially away from the free end of the end region, the contact surface being configured to contact and frictionally engage a wall of a balance weight fixing clamp wherein said wall is free of locking projections or protuberances, the contact surface being substantially parallel to a projection of said generally radially facing surface of the end region at the location of the recess.

10. A wheel rim according to claim 9, wherein the contact surface is configured to contact a smooth wall of a balance weight fixing clamp along substantially the entire length of the contact surface.

11. A wheel rim according to claim 10, wherein the balance weight fixing clamp is formed as a substantially U-shaped smooth wall.

12. A wheel rim according to claim 9, wherein the recess is annular and has a substantially wedge-shaped cross-section.

13. A wheel rim according to claim 9, wherein the recess is defined in a generally radially outwardly facing surface of the end region.

14. A wheel rim according to claim 9, wherein the wheel rim has two flanges each having said end region and recess.

15. A wheel rim according to claim 9, wherein the contact surface of the recess is substantially conical.

16. A wheel disc, comprising a peripheral wheel flange defining an end region that has a portion that extends generally radially outwardly and transitions into a further portion that extends generally axially outwardly to a free end, a generally radially facing surface of the end region defining a fitting recess therein, the recess extending circumferentially about the wheel flange for engagement by at least one wheel balance weight, the recess defining a contact surface having a length extending generally axially away from the free end of the end region, the contact surface being configured to contact and frictionally engage a wall of a balance weight fixing clamp wherein said wall is free of locking projections or protuberances, the contact surface being substantially parallel to a projection of said generally radially facing surface of the end region at the location of the recess.

17. A wheel disc according to claim 16, wherein the contact surface is configured to contact a smooth wall of a balance weight fixing clamp along substantially the entire length of the contact surface.

18. A wheel disc according to claim 17, wherein the balance weight fixing clamp is formed as a substantially U-shaped smooth wall.

19. A wheel disc according to claim 16, wherein the recess is annular and has a substantially wedge-shaped cross-section.

20. A wheel disc according to claim 16, in combination with a wheel rim comprising a peripheral wheel flange defining an end region that has a portion that extends generally radially outwardly and transitions into a further portion that extends generally axially outwardly to a free end, a generally radially facing surface of the end region defining a fitting recess therein, the recess extending circumferentially about the wheel flange for engagement by at least one wheel balance weight, the recess defining a contact surface having a length extending generally axially away from the free end of the end region, the contact surface being configured to contact and frictionally engage a wall of a balance weight fixing clamp wherein said wall is free of locking projections or protuberances, the contact surface being substantially parallel to projection of said generally radially facing surface of the end region at the location of the recess.

* * * * *